(12) United States Patent
Lambert et al.

(10) Patent No.: US 9,466,982 B2
(45) Date of Patent: Oct. 11, 2016

(54) SYSTEM AND METHOD FOR CONTROL OF POWER CONSUMPTION OF INFORMATION HANDLING SYSTEM DEVICES

(75) Inventors: Timothy M. Lambert, Austin, TX (US); Shawn Joel Dube, Austin, TX (US)

(73) Assignee: DELL PRODUCTS L.P., Round Rock, TX (US)

( * ) Notice: Subject to any disclaimer, the term of this patent is extended or adjusted under 35 U.S.C. 154(b) by 292 days.

(21) Appl. No.: 12/939,432

(22) Filed: Nov. 4, 2010

(65) Prior Publication Data

US 2012/0117398 A1    May 10, 2012

(51) Int. Cl.
| | | |
|---|---|---|
| *H02J 1/14* | (2006.01) | |
| *G06F 1/26* | (2006.01) | |
| *G06F 1/32* | (2006.01) | |
| *G06F 1/30* | (2006.01) | |
| *G06F 11/30* | (2006.01) | |

(52) U.S. Cl.
CPC .............. *H02J 1/14* (2013.01); *G06F 1/324* (2013.01); *G06F 1/3206* (2013.01); *G06F 1/26* (2013.01); *G06F 1/305* (2013.01); *G06F 1/3253* (2013.01); *G06F 1/3296* (2013.01); *G06F 11/30* (2013.01); *Y02B 60/1217* (2013.01)

(58) Field of Classification Search
CPC ........ G06F 11/30; G06F 1/3206; G06F 1/26; G06F 1/305; G06F 1/3253; G06F 1/3296; G06F 1/324; H02J 1/14; Y02B 60/1217
USPC ................. 713/300, 320, 324, 340
See application file for complete search history.

(56) References Cited

U.S. PATENT DOCUMENTS

| | | | | |
|---|---|---|---|---|
| 5,483,656 | A * | 1/1996 | Oprescu et al. ............... | 713/320 |
| 5,678,011 | A * | 10/1997 | Kim et al. .................... | 710/301 |
| 5,835,780 | A * | 11/1998 | Osaki et al. .................. | 713/300 |
| 6,182,232 | B1 * | 1/2001 | Klein ............................ | 713/340 |
| 7,024,569 | B1 * | 4/2006 | Wright et al. ................ | 713/300 |
| 7,177,728 | B2 * | 2/2007 | Gardner ....................... | 700/295 |
| 2005/0028017 | A1 * | 2/2005 | Janakiraman et al. ....... | 713/340 |
| 2008/0077817 | A1 * | 3/2008 | Brundridge et al. ......... | 713/340 |
| 2008/0168283 | A1 * | 7/2008 | Penning .................. | G06F 1/263 |
| | | | | 713/310 |
| 2010/0162024 | A1 * | 6/2010 | Kuris et al. ................... | 713/340 |
| 2012/0117398 | A1 * | 5/2012 | Lambert et al. .............. | 713/320 |
| 2012/0185107 | A1 * | 7/2012 | Takehara et al. ............. | 700/292 |

OTHER PUBLICATIONS

Davis, Leroy. "PCI Bus Pinout Signal Names" . Interfacebus.com. Published Feb. 2, 2006. Accessed Jun. 5, 2013 <http://www.interfacebus.com/Design_PCI_Pinout.html>.*

* cited by examiner

*Primary Examiner* — Jaweed A Abbaszadeh
*Assistant Examiner* — Terrell Johnson
(74) *Attorney, Agent, or Firm* — Baker Botts L.L.P.

(57) ABSTRACT

Systems and methods for controlling power usage of devices in information handling systems are provided. A device for use in an information handling system may include a connector and an auxiliary power connector. The connector may be configured to electrically couple to a device connector such that the device transmits and receives data via the device connector and receives electrical current from a power supply via the device connector. The auxiliary power connector may be configured to electrically couple the device to the power supply such that the device receives electrical current from the power supply via the device connector, the auxiliary power connector including at least one sense line, the at least one sense line configured to receive at least one power control signal. The device may be configured to establish its power usage in response to receiving the at least one power control signal.

14 Claims, 2 Drawing Sheets

SYSTEM AND METHOD FOR CONTROL OF POWER CONSUMPTION OF INFORMATION HANDLING SYSTEM DEVICES

TECHNICAL FIELD

The present disclosure relates in general to information handling systems, and more particularly to power control of information handling system devices.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

During operation of an information handling system, numerous events may occur in which the available power from power supplies delivering electrical current to the information handling system and its components may decrease. To ensure effective operation of an information handling system after such a decrease in available power, it may be desired to reduce the power requirements ("throttle") of one or more components of the information handling system, particularly such components that require higher levels of power during normal operation. When throttled, a component may enter a lower-power state in which it decreases functionality (e.g., processing and transfer of data at slower rates) but consumes less power.

Traditionally, throttling of information handling system components has been performed by software. However, software-based throttling often requires significant time between the time a throttling stimulus is received and a throttling occur due to processing overhead associated with software.

SUMMARY

In accordance with the teachings of the present disclosure, the disadvantages and problems associated with controlling power usage of devices in information handling systems, and in particular throttling of devices in information handling systems, have been reduced or eliminated.

In accordance with teachings of the present disclosure, a device for use in an information handling system may include a connector and an auxiliary power connector. The connector may be configured to electrically couple to a device connector such that the device transmits and receives data via the device connector and receives electrical current from a power supply via the device connector. The auxiliary power connector may be configured to electrically couple the device to the power supply such that the device receives electrical current from the power supply via the device connector, the auxiliary power connector including at least one sense line, the at least one sense line configured to receive at least one power control signal. The device may be configured to establish its power usage in response to receiving the at least one power control signal.

In accordance with additional teachings of the present disclosure, an information handling system may include a processor, a power supply, power control logic, and a device. The power control logic may be configured to determine whether a stimulus has been received indicative of a power availability of the power supply and transmit at least one power control signal in response to receiving the stimulus. The device may be electrically coupled to the power supply via a device connector such that the device transmits data to and receives data from the processor via the device connector and receives electrical current from a power supply via the device connector, the device comprising an auxiliary power connector configured to electrically couple the device to the power supply such that the device receives electrical current from the power supply via the device connector. The auxiliary power connector may include at least one sense line, the at least one sense line configured to receive the at least one power control signal. The device may be configured to establish its power usage in response to receiving the at least one power control signal.

In accordance with further teachings of the present disclosure, a method may include transmitting and receiving data at a device via a device connector. The method may also include receiving electrical current at the device from a power supply via the device connector. The method may additionally include receiving electrical current at the device from a power supply via the auxiliary power connector. The method may further include receiving at least one power control signal at the device via at least one sense line of the auxiliary power connector. Moreover, the method may include establishing power usage for the device in response to receiving the at least one power signal.

Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
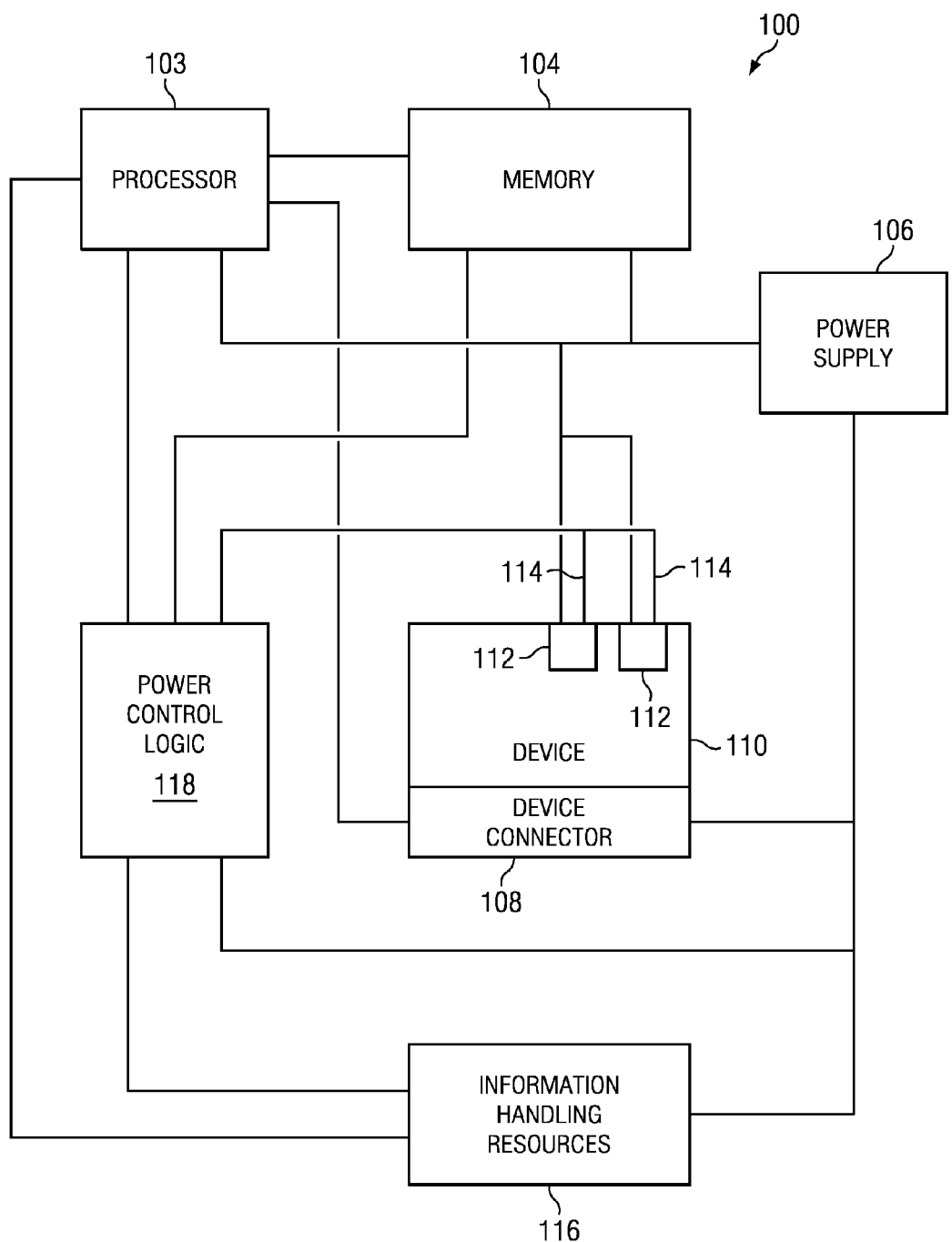
FIG. 1 illustrates a block diagram of an example information handling system, in accordance with certain embodiments of the present disclosure.
Figure 2:
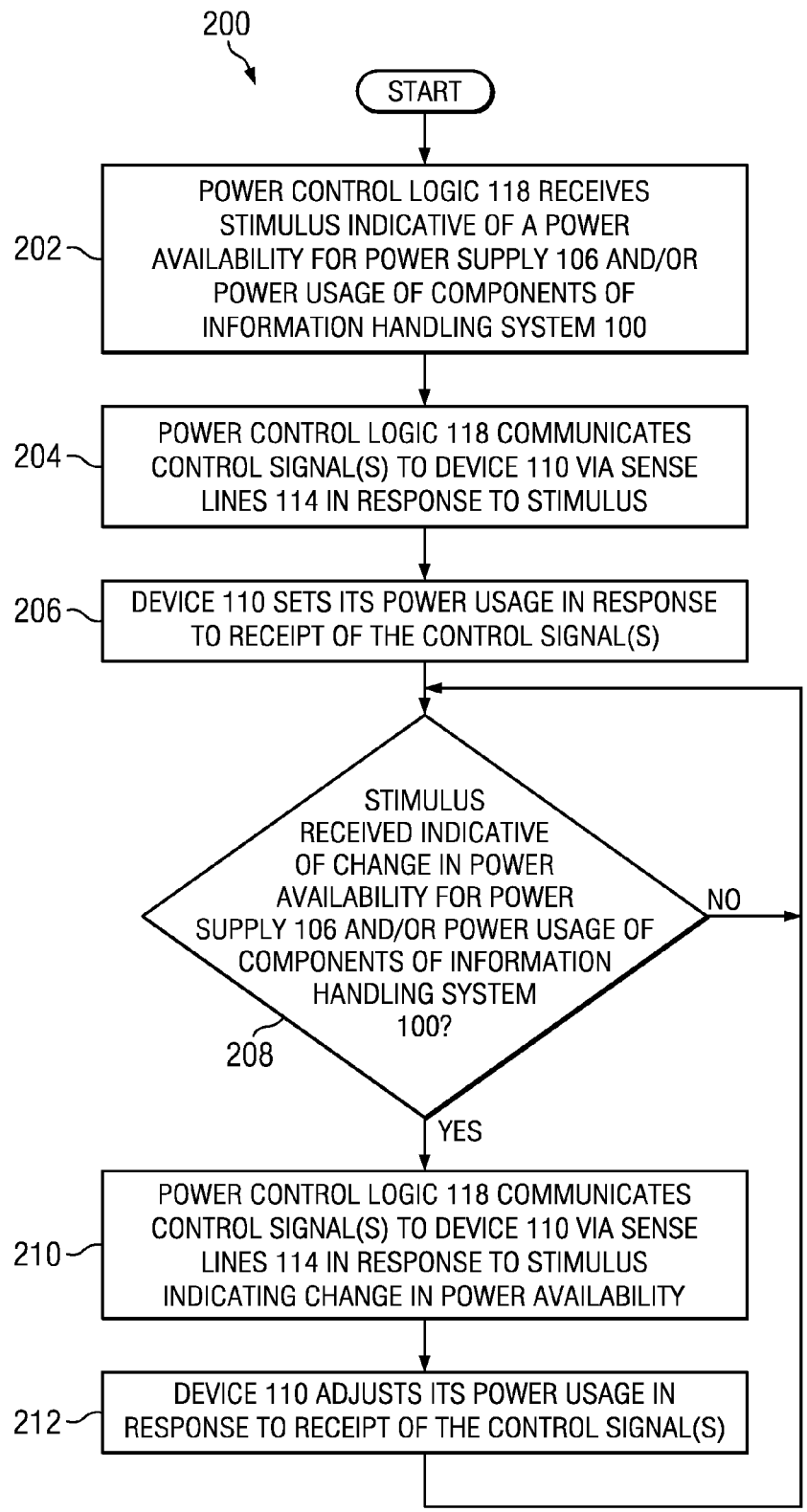
FIG. 2 illustrates a flow chart of an example method for controlling power usage of device of an information handling system, in accordance with certain embodiments of the present disclosure.

Preferred embodiments and their advantages are best understood by reference to FIGS. 1 and 2, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, information handling resources may broadly refer to any component system, device or apparatus of an information handling system, including without limitation processors, busses, memories, input-output devices and/or interfaces, storage resources, network interfaces, motherboards, electro-mechanical devices (e.g., fans), displays, and power supplies.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such wires, optical fibers, microwaves, radio waves, and other electromagnetic and/or optical carriers; and/or any combination of the foregoing.

FIG. 1 illustrates a block diagram of an example information handling system 100, in accordance with certain embodiments of the present disclosure. In certain embodiments, information handling system 100 may comprise a computer chassis or enclosure (e.g., a server chassis holding one or more server blades). In other embodiments, information handling system 100 may comprise a storage enclosure. In yet other embodiments, information handling system 100 may be a personal computer (e.g., a desktop computer or a portable computer). As depicted in FIG. 1, information handling system 100 may include a processor 103, a memory 104, a power supply 106, a device connector 108, a device 110, information handling resources 116, and power control logic 118.

Processor 103 may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 100. Although FIG. 1 depicts information handling system 100 as including one processor 103, information handling system 100 may include any suitable number of processors 103.

Memory 104 may be communicatively coupled to processor 103 and may include any system, device, or apparatus configured to retain program instructions and/or data for a period of time (e.g., computer-readable media). Memory 104 may include random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to information handling system 100 is turned off. Although FIG. 1 depicts information handling system 100 as including one memory 104, information handling system 100 may include any suitable number of memories 104.

Power supply 106 may be electrically coupled to various components of information handling system 100 and may include any device, system, or apparatus operable to supply electrical energy to one or more components of information handling system 100. Although FIG. 1 depicts information handling system 100 as including one power supply 106, information handling system 100 may include any suitable number of power supplies 106.

Device connector 108 may be communicatively coupled to processor 103 and electrically coupled to power supply 106, and may be configured to receive a device 110. In some embodiments, device connector 108 may be an integral portion of a motherboard upon which other components of information handling system (e.g., processor 103, connectors for memory 104, etc.) are mounted. In these and other embodiments, device connector 108 may comprise a Peripheral Component Interconnect (PCI) expansion slot.

Device 110 may be a printed circuit board or other device that may be inserted or otherwise mechanically and electrically coupled to device connector 108 in order to add functionality to information handling system 100. Device connector 108 may establish electrical contact between device 110 and other components of information handling system 100 (e.g., processor 103 and power supply 106) such that device 110 may receive electrical current from power supply 106 via device connector 108 and/or may transmit and/or receive data from processor 103 via device connector 108. For example, in embodiments in which device 110 comprises a printed circuit board, one edge of the printed circuit board may include an edge connector having electrically conductive contacts that fit into device connector 108 which establish electrical contact between electronics (e.g., integrated circuits) on device 110 and electronics on a motherboard. In some embodiments, device 110 may comprise a Peripheral Component Interconnect (PCI) expansion card. In the same or alternative embodiments, device 110 may include a general purpose graphics processing unit (GPGPU).

As shown in FIG. 1, device 110 may include one or more auxiliary power connectors 112. An auxiliary power connector 112 may be configured to receive corresponding connectors via which electrical current may be supplied from power supply 106, thus allowing device 110 to draw current from power supply 106 via device connector 108 and auxiliary power connectors 112. A power connector 112 may also be associated with a sense line 114, as shown in FIG. 1. In some embodiments, power drawn via device connector 108 may remain available regardless of the available power of power supply 106, while the maximum power drawn via auxiliary power connectors 112 may be variable and/or may be adjusted based on the available power of power supply 106, as described in greater detail below.

Sense lines 114 may be communicatively coupled to power control logic 118, thus permitting device 108 to receive control signals from power control logic 118, as described in greater detail below.

Information handling resources 116 may be communicatively coupled to processor 103 and may include any component system, device or apparatus of an information handling system, including without limitation processors, busses, memories, input-output devices and/or interfaces, storage resources, network interfaces, motherboards, electro-mechanical devices (e.g., fans), displays, and power supplies.

Power control logic 118 may be communicatively coupled to various components of information handling system 100 and may comprise any system, device, or apparatus configured to receive one or more stimuli indicative of a power availability for power supply 106 and adjust the power usage of device 110 in response to such stimuli. Examples of stimuli are described below in connection with the discussion of method 200. In some embodiments, power control logic 118 may include a complex programmable logic device (CPLD).

The operation of components of information handling system 200 may be illustrated by FIG. 2. FIG. 2 illustrates a flow chart of an example method 200 for controlling power usage of device (e.g., device 110), in accordance with certain embodiments of the present disclosure. According to one embodiment, method 200 may begin at step 202. As noted above, teachings of the present disclosure may be implemented in a variety of configurations of system 100. As such, the preferred initialization point for method 200 and the order of the steps 202-212 comprising method 200 may depend on the implementation chosen.

At step 202, power control logic 118 may receive stimulus indicative of a power availability for power supply 106 and/or power usage of components of information handling system 100. In some embodiments, such stimulus may be received at startup or power on of information handling system 100 or as part of an initialization of power control logic 118 and/or another component of information handling system 100. Among the stimuli that may be received by power control logic 118 include, without limitation:

- temperature conditions of power supply 106 or its components (e.g., voltage regulators);
- events associated with memory (e.g., temperature conditions associated with memory);
- commands from node manager management engine or a datacenter manager;
- alerts associated with power supply 106 (e.g., output overcurrent warning, overtemperature warning, undervoltage warning);
- parameters from current monitors and/or power monitors for components of information handling system 100 indicative of power draw/power requirements of such components;
- commands received from an access controller (e.g., Integrated Dell Remote Access Controller); and
- commands received from a chassis management controller).

At step 204, power control logic 118 may communicate one or more control signals to device 110 via sense lines 114 in response to receipt of the stimulus. In some embodiments, such control signals may be indicative of the amount of power (e.g., a maximum power availability) to be used by device 110. In these embodiments, such amount may be determined based on the power availability of power supply 106, the power usage and/or power requirements of other components of information handling system 100, and/or any other parameters.

At step 206, device 110 may set its power usage in response to receipt of the one or more control signals. For example, based on the received control signal(s), device 110 may set a maximum amount of power to be drawn by the device 110 via auxiliary power connectors 112.

At step 208, power control logic 118 may determine whether a stimulus has been received indicative of a change in power availability for power supply 106 and/or power usage of components of information handling system 100. In some embodiments, such change may be a reduction in the power availability of power supply 106. If a stimulus indicative change has been received, method 200 may proceed to step 210. Otherwise, if such a stimulus has not been received, step 208 may repeat until such stimulus is received. The stimuli indicative of a change in power availability or power usage may be the same or similar to those described above in reference to step 202.

At step 210, power control logic may communicate one or more control signals to device 110 via sense lines 114 in response to stimulus indicating a change in power availability. As in step 204, such control signals may be indicative of the amount of power (e.g., a maximum power availability) to be used by device 110 and such amount may be determined based on the power availability of power supply 106, the power usage and/or power requirements of other components of information handling system 100, and/or any other parameters.

At step 212, device 110 may adjust its power usage in response to receipt of the one or more control signals. In instances in which the control signals arise as a result of a reduction in available power of power supply 106, device 110 may reduce its power usage. For example, based on the received control signal(s), device 110 may adjust a maximum amount of power to be drawn by the device 110 via auxiliary power connectors 112. In some embodiments, such reduction in power usage and/or reduction in maximum power to be drawn via auxiliary power connectors 112 may be substantially instantaneous. After completion of step 212, method 200 may proceed again to step 208.

Although FIG. 2 discloses a particular number of steps to be taken with respect to method 200, method 200 may be executed with greater or lesser steps than those depicted in FIG. 2. In addition, although FIG. 2 discloses a certain order of steps to be taken with respect to method 200, the steps comprising method 200 may be completed in any suitable order. In addition, the steps comprising method 200 may be repeated, independently and/or collectively, as often as desired or required by a chosen implementation.

Method 200 may be implemented using information handling system 100 or any other system operable to implement method 200. In certain embodiments, method 200 may be implemented partially or fully in software and/or firmware embodied in computer-readable media.

Although the present disclosure has been described in detail, it should be understood that various changes, substitutions, and alterations can be made hereto without departing from the spirit and the scope of the disclosure as defined by the appended claims.

What is claimed is:

1. A device for use in an information handling system, comprising:
    a device connector configured to:
        communicatively couple a device to a processor such that the device transmits and receives data via the device connector; and
        electrically couple the device to a power supply such that the device receives power via the device connector; and
    an auxiliary power connector configured to electrically couple the device to the power supply, the auxiliary power connector including at least one sense line configured to receive at least one power control signal;
    wherein the power drawn by the device from the power supply via the auxiliary power connector is configured to be adjusted by:
        receiving a first stimulus indicative of a power availability for the power supply and a power usage of other components of an information handling system;
        receiving the at least one power control signal at the device via the at least one sense line, the at least one power control signal communicated in response to receipt of the first stimulus and indicative of power requirements of the other components of the information handling system;
        determining an amount of power drawn by the device via the auxiliary power connector based on the at least one power control signal;
        monitoring the power availability of the power supply during operation of the device;
        receiving a second stimulus indicative of a reduction in the power availability of the power supply; and
        reducing the amount of power drawn by the device via the auxiliary power connector in response to receipt of the second stimulus, wherein the auxiliary power connector continues to provide power from the power supply to the device.

2. A device in accordance with claim 1, wherein:
    the at least one power control signal is indicative of a change in power availability of the power supply; and
    the device is configured to adjust its power usage in response to receiving the at least one power control signal.

3. A device in accordance with claim 1, the device configured to establish a maximum amount of power to be drawn by the device via the auxiliary power connector.

4. A device in accordance with claim 1, wherein the device is a Peripheral Component Interconnect expansion card.

5. A device in accordance with claim 1, wherein the device is a general purpose graphics processing unit.

6. An information handling system comprising:
    a processor;
    a power supply;
    power control logic configured to determine whether a first stimulus has been received and transmit at least one power control signal in response to receiving the stimulus, the first stimulus and the at least one power control signal indicative of power requirements of other components of the information handling system; and
    a device configured to adjust its power usage based on the power requirements of other components of the information handling system indicated by the at least one power control signal, the device including a device connector configured to:
        communicatively couple the device to the processor such that the device transmits data to and receives data from the processor via the device connector; and
        electrically couple the device to a power supply such that the device receives power from the power supply via the device connector; and
    an auxiliary power connector configured to electrically couple the device to the power supply, the auxiliary power connector including at least one sense line configured to receive the at least one power control signal, the power drawn by the device from the power supply via the auxiliary power connector is configured to be adjusted by:
        receiving the at least one power control signal at the device via the at least one sense line;
        determining an amount of power drawn by the device via the auxiliary power connector based on the at least one power control signal;
        monitoring the power availability of the power supply during operation of the device;
        receiving a second stimulus indicative of a reduction in the power availability of the power supply; and
        reducing the amount of power drawn by the device via the auxiliary power connector in response to receipt of the second stimulus, wherein the auxiliary power connector continues to provide power from the power supply to the device.

7. An information handling system in accordance with claim 6, the device configured to establish a maximum amount of power to be drawn by the device via the auxiliary power connector.

8. An information handling system in accordance with claim 6, wherein the device is a Peripheral Component Interconnect expansion card.

9. An information handling system in accordance with claim 6, wherein the device is a general purpose graphics processing unit.

10. A method comprising:
    transmitting and receiving data at a device via a device connector;
    receiving power at the device from a power supply via the device connector;
    receiving power at the device from the power supply via an auxiliary power connector;
    receiving a first stimulus indicative of a power availability for the power supply and a power usage of other components of an information handling system;
    receiving at least one power control signal at the device via at least one sense line of the auxiliary power connector, the at least one power control signal communicated in response to receipt of the first stimulus and indicative of power requirements of the other components of the information handling system;
    determining an amount of power drawn by the device via the auxiliary power connector based on the at least one power control signal;
    monitoring the power availability of the power supply during operation of the device;
    receiving a second stimulus indicative of a reduction in the power availability of the power supply; and
    reducing the amount of power drawn by the device via the auxiliary power connector in response to receipt of the second stimulus, wherein the auxiliary power connector continues to provide power from the power supply to the device.

11. A method in accordance with claim 10, wherein the at least one power control signal is indicative of a change in power availability of the power supply and establishing power usage for the device comprises adjusting power usage for the device in response to receiving the at least one power signal.

12. A method in accordance with claim 10, wherein establishing power usage for the device comprises establishing a maximum amount of power to be drawn by the device via the auxiliary power connector.

13. A method in accordance with claim 10, wherein the device is a Peripheral Component Interconnect expansion card.

14. A method in accordance with claim 10, wherein the device is a general purpose graphics processing unit.

\* \* \* \* \*